United States Patent [19]

Troemel et al.

[11] Patent Number: 4,992,706

[45] Date of Patent: Feb. 12, 1991

[54] CRT RASTER DISTORTION CORRECTION CIRCUIT

[75] Inventors: Stephen T. Troemel, Jefferson City; William F. Guerinot, Knoxville, both of Tenn.

[73] Assignee: North American Philips Corporation, New York, N.Y.

[21] Appl. No.: 483,192

[22] Filed: Feb. 21, 1990

[51] Int. Cl.$^5$ ......................... H01J 29/70; H01J 29/76
[52] U.S. Cl. ..................................... 315/368; 315/370
[58] Field of Search ................. 315/368, 370, 371, 383

[56] References Cited

U.S. PATENT DOCUMENTS 4,870,329  9/1989  Ara ...................................... 315/368

Primary Examiner—Theodore M. Blum
Attorney, Agent, or Firm—Leroy Eason

[57] ABSTRACT

A circuit for correcting raster distortion on a CRT display screen. Horizontal distortion is corrected by overscanning and providing complementary modification of the time delay and data rate at which digital video data is supplied to the CRT during each scanning line. The video data for a given scanning line is stored in a line store, read-out therefrom being controlled by a microprocessor programmed to determine the necessary time delay and data rate of such read-out. Vertical distortion, affecting scanning lines in the vicinity of the top and bottom of the raster, is corrected by storing in a multiline store the video data for all such scanning lines. The same or a further microprocessor is programmed to re-assign the video data for pixels on each of such lines to vertically corresponding pixels on others of the scanning lines, such re-assignments being complementary to the vertical distortion of the original scanning lines.

3 Claims, 3 Drawing Sheets

CRT RASTER DISTORTION CORRECTION CIRCUIT

BACKGROUND OF THE INVENTION

1. Field of the Invention

The invention relates to correction of raster distortion on the display screen of a cathode ray picture tube (CRT), and particularly to a circuit for correcting such distortion without requiring modification of the CRT deflection yoke for that purpose. Such correction is particularly important in a projection television receiver, wherein the respective images on the display screens of three monochrome CRTs are projected to form a composite color image on a projection screen.

2. Description of the Related Art

Projection television receivers commonly employ three monochromatic CRTs producing respective primary color components of a composite color video image, the monochrome images being combined by projection so as to form the composite color image on a projection screen.

It is, of course, essential that the monochrome images be precisely superposed at the projection screen, which condition is preferred to as image convergence. Convergence error, or misconvergence, is frequently caused by non-linear distortion of the raster on the display screen of each of the CRTs. Such distortion frequently takes the form of "pincushioning", due to an excessive increase in the deflection of the electron beam of the CRT near the edges of the raster.

It is known to provide convergence correction by providing compensating non-linear distortion of the electron beam deflection. That has been achieved by providing either a non-linear deflection yoke design including additional convergence correction windings, or by providing non-linear waveforms of the sweep signals which generate the raster. See, for example, the text book "Television Engineering Handbook", K. Benson, McGraw-Hill Book Co. 1986, par. 10.5.2. However, such methods due not produce entirely satisfactory results and are expensive to implement. It would be advantageous to provide correction for image raster distortion without altering the linear design of the deflection yoke or the linearity of the sweep signals which produce the raster on the CRT display screen.

SUMMARY OF THE INVENTION

The invention provides a circuit which corrects for non-linear distortion of the raster on the display screen of a CRT by providing complementary modification of the time delay and data rate at which video data is supplied for respective scanning lines of the raster. Such a correction circuit comprises a line store for receiving and storing, prior to each scanning line, the digital video data for the successive pixels on such scanning line. It also comprises clock pulse generating means for supplying read-out clock pulses to the line store to cause read-out of the video data therefrom at a rate determined by the clock pulse rate, such read-out commencing when the line store has been enabled by a read-enable signal supplied thereto. The circuit is controlled by a microprocessor programmed with a correction algorithm for determining, based on the relationship between the length of each successive scanning line and the period of the horizontal (H) sweep signal, a time delay value $t_{d1}$) and a data rate (R). The value of $t_{d1}$ for a given scanning line corresponds to the delay between initiation of such line by the H sweep signal and the instant at which the first pixel thereon is reached in the visible raster, such delay resulting from lengthening of such line due to raster distortion. The date rate R is the rate at which video data must be supplied for the successive pixels on such line in order to compensate for the reduced scanning time resulting from the aforesaid time delay. The microprocessor supplies a read-enable pulse to the line store after the time delay $t_{d1}$ following initiation of the H sweep signal for a particular scanning line, and also supplies a pulse rate modulating signal to the line store for controlling the pulse rate thereof to correspond with the date rate R for such scanning line.

The distortion correction circuit may also include, as a further feature thereof, correction for non-linear vertical displacement of scanning lines in the vicinity of the upper and lower edges of the CRT raster. For that purpose, it may further include a multiline store for receiving and storing, prior to such scanning lines, digital video data corresponding to the successive pixels on each of such lines. A further microprocessor (which may physically be realized by further programming of the aforesaid microprocessor) carries out a video data line re-assignment algorithm by which, based on the extent of vertical displacement of successive pixels on each of the vertically displaced scanning lines, a complementary vertical re-assignment of the video data corresponding thereto to pixels on others of such scanning lines in determined so as to compensate for such distortion. In accordance with such algorithm, in response to the H sweep signal for any of the vertically displaced scanning lines, the microprocessor supplies read-out signals to the multiline store which produce read-out therefrom of the video data for pixels on one or more others of such scanning lines.

BRIEF DESCRIPTION OF THE DRAWINGS

A more complete description of the invention is given below with reference to the accompanying drawings, in which.

DESCRIPTION OF THE PREFERRED EMBODIMENTS

Figure 1A:
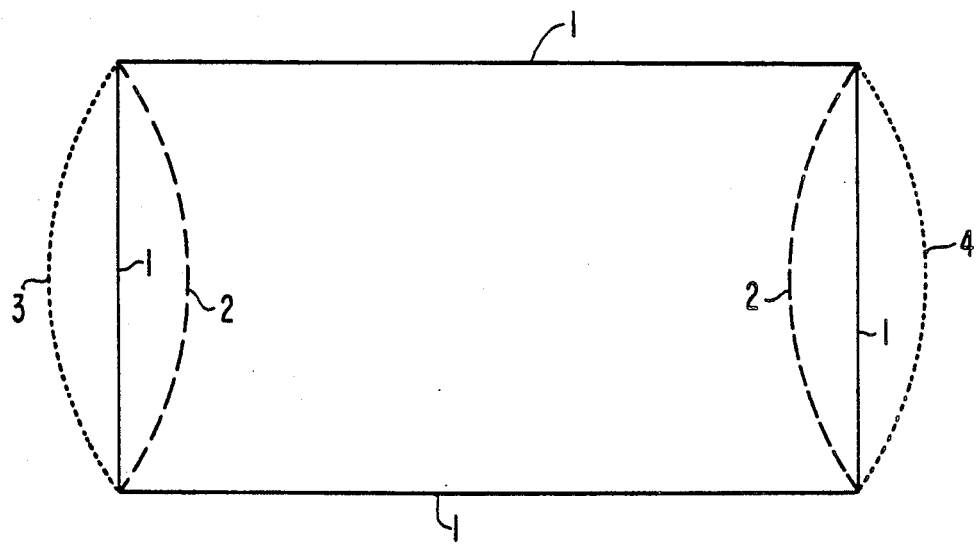
FIGS. 1(a) and 1(b) illustrate typical horizontal distortion of the raster on the display screen of a CRT and the necessary complementary compensating modifications of the video data.

FIG. 1(a) shows the rectangular image raster on the screen of a CRT having, for example, a 9:16 height/width proportioning, which is presently preferred for high definition television receivers. Such a raster, in the NTSC television broadcast standard, consists of 525 H lines constituting an image frame, each frame comprising two successive interlaced fields recurring the rate of 60 per sec. The raster is produced by supplying H and V sweep signals to H and V coils of the deflection yoke of the CRT. Such signals generally have a saw-tooth waveform, increasing substantially linearly from a reference level to a maximum level up during each cycle thereof. The CRT beam commences a new H scanning line upon initiation of each cycle of the H sweep signal, and commences a new field upon initiation of each cycle of the V sweep signal, the latter being of much lower frequency than the H sweep signal. Further information concerning raster generation can be found in the above-identified textbook by K. Benson. The correct image raster is framed by lines 1 in FIG. 1a.

Due to inherent non-linear distortion of the relationship between the sweep signals and the resulting electron beam deflection on the display screen of a CRT, the raster formed on such screen frequently exhibits "keystone" distortion in the H direction as shown by the dashed lines 2 in FIG. 1a. Thus, instead of filling the frame defined by lines 1, the video image is increasingly horizontally compressed going toward the central H scanning line. Such distortion could be corrected by introducing a complementary non-linear waveform of the H sweep signal, each cycle thereof commencing as shown by dotted line 3 and ending as shown by dotted line 4. However, as noted above, this is cumbersome and expensive to implement. Further, since the video information cannot be displayed until the H scanning line reaches the visible raster on the screen, if the video signal is in digital form and is synchronized with the H sweep signal there will be a loss of video data during the time intervals between lines 1–3 and between lines 1–4. Such intervals change for each scanning line.

Figure 1B:
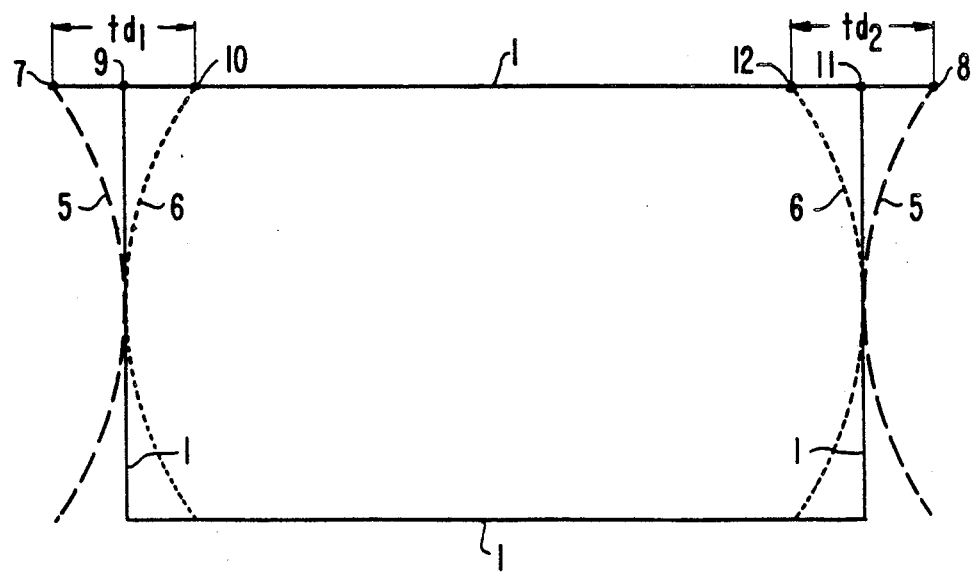

Correction of such H distortion, in accordance with the invention, requires as a first aspect thereof that the image raster be overscanned as shown in FIG 1b. Therein the dashed lines 5 define the overscan contour to which the "H" scanning lines are extended by an H sweep signal of sufficient amplitude so that the most compressed scanning line, which is at the horizontal center of the raster, is of sufficient length to just extend across the raster. This results, of course, in excessive lengths of all other H scanning lines, so that if video data is supplied during the time from the beginning to the end of such lines it will not all be reproduced in the visible raster. To correct for that, a complementary modification of the time delay and data rate of the the video data supplied during each cycle of the sweep signal is necessary, as shown by the contour defined by dotted lines 6 in FIG. 1b. For example, for the first or "0" H scanning line at the top of the raster, the initial and final points 7 and 8 of which correspond to the beginning and end of the sweep cycle, if the video data for the pixel at point 9 is addressed to such pixel it will actually be reproduced at point 7. It therefore should be addressed to the pixel at point 10, the complement of point 7 with respect to point 9. Consequently, the video data for point 9 must be delayed for a time interval $t_{d1}$ after commencement of the sweep cycle. At the opposite end of the line, if the video data for the pixel at point 11 were addressed to such pixel it would actually be reproduced at point 8. It therefore should be addressed to the pixel at point 12, the complement of point 8 with respect to point 11. To do so, the video data for point 11 must be advanced a time interval $t_{d2}$ prior to the end of the sweep cycle. The scanning time of the line H=0 will therefore be $T-(t_{d1}+t_{d2})$, where T is the period of the sweep signal. Since the raster distortion is generally the same at each end of the display, $t_{d1}=t_{d2}$ and so the scanning time of a line will be $T-2 t_{d1}$. If the number of pixels on each scanning line in the visible raster is P, the rate R at which video data must be supplied to such line will be given by $$R = \frac{P}{T - 2t_{d1}}$$

Figure 2:
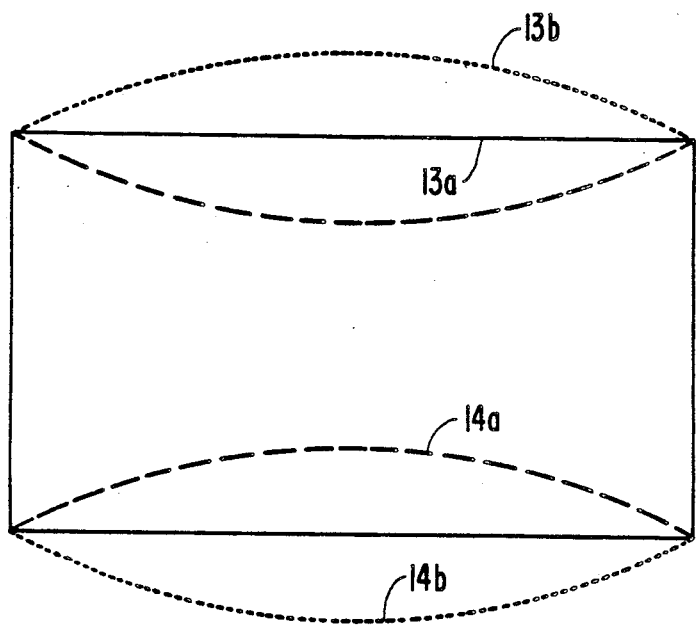
FIG. 2 illustrates vertical distortion of scanning lines in the vicinity of the upper and lower edges of a CRT raster.

Vertical distortion of a CRT raster is similar to that in the H direction. FIG. 2 shows a typical form of such vertical distortion, the dashed lines 13a and 14a showing that for a number of scanning lines in the vicinity of the upper and lower edges of the raster such lines are non-linearly vertically displaced. The dotted lines 13b and 14b show the required non-linear complementary modification of the V deflection in order to correct such raster distortion. However, just as in the case of correction of H raster distortion as described above, that would require the provision of static convergence correction coils in the CRT deflection yoke. To avoid that, in accordance with the invention vertical distortion is compensated by a complementary re-assignment of the video data applicable to pixels on H scanning lines in the vicinity of the top and bottom edges of the CRT raster. This approach is necessary because, in contrast to correction of H distortion, overscanning in the vertical direction is not feasible since V distortion occurs during each video field and the vertical sweep signal cyclically recurs only upon completion of each field.

The method employed for correcting V distortion can be understood from consideration of the following typical example in Table I of how the video data for pixels on a few H scanning lines (e.g., six) at the top of the raster can be stored in a digital memory, using for purposes of illustration only 9 pixels symmetrically positioned on either side of the center of such line:

TABLE I

| | | | MEMORY ADDRESS | | | | | | |
|---|---|---|---|---|---|---|---|---|---|
| Line 1 | 0,0 | 0,1 | 0,2 | 0,3 | 0,4 | 0,5 | 0,6 | 0,7 | 0,8 |
| Line 2 | 1,0 | 1,1 | 1,2 | 1,3 | 1,4 | 1,5 | 1,6 | 1,7 | 1,8 |
| Line 3 | 2,0 | 2,1 | 2,2 | 2,3 | 2,4 | 2,5 | 2,6 | 2,7 | 2,8 |
| Line 4 | 3,0 | 3,1 | 3,2 | 3,3. | 3,4 | 3,5 | 3,6 | 3,7 | 3,8 |
| Line 5 | 4,0 | 4,1 | 4,2 | 4,3 | 4,4 | 4,5 | 4,6 | 4,7 | 4,8 |
| Line 6 | 5,0 | 5,1 | 5,2 | 5,3 | 5,4 | 5,5 | 5,6 | 5,7 | 5,8 |

Figure 3:
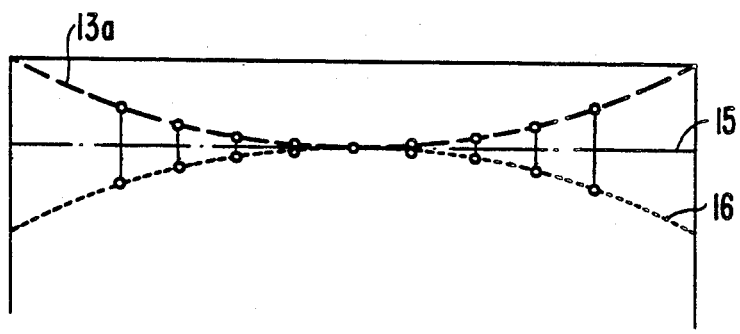
FIG. 3 illustrates how such distortion may be corrected by complementary reassignments of the video data for such lines.

In Table I, for example, the video data for the fourth pixel on the first line (H=0), is stored at address 0,4. Similar address assignments are applicable to the pixels on all of the six lines. In FIG. 3 the dashed line 13a is the vertically distorted first scanning line H=0. Shown thereon are the pixels corresponding to the video data stored for such line as shown in Table I. It is seen that the keystone distortion has displaced all such pixels except the one at the very center (pixel 0,4) by a few scanning lines in the vertically upward direction from the horizontal 15. Such distortion can therefore be compensated by a complementary re-assignment of the video data corresponding to such pixels to scanning lines displaced by an equal amount in the vertically downward direction. Such re-assignments will therefore be along the dotted correction curve 16 in FIG. 3, which is the complement of the distorted scanning line 13a relative to the horizontal 15.

For example, the pixels 0,3 and 0,5 on scanning line 13a have been displaced one scanning line above the horizontal line 15, and so the video data applicable thereto is re-assigned to vertically corresponding pixels on the scanning line one below the horizontal line 15. The video data for the central pixel, 0,4, need not be re-assigned since such pixel is already at the correct location of the scanning line. That is also true of the central pixel on all the remaining distorted scanning lines. Upon read-out of the video data stored at addresses 0,3 and 0,5, such data will therefore be produced, as a result of the keystone distortion on the correct horizontal line 15. This procedure can be applied to all the pixels on line H=0, on the basis that pixels successively further from central pixel 0,4 are displaced by vertical distortion to successively further upward scanning lines. The vertical distortion of scanning lines in the vicinity of the top of the CRT raster can therefore be corrected by re-assignment of the stored video data for pixels successively further from the center of any one of such lines to vertically corresponding pixels on successively further downward scanning lines. For the first scanning line H=0, such a read-out algorithm would be as shown in the following Table II:

TABLE II

| MEMORY READ-OUT | | | | | | | | | |
|---|---|---|---|---|---|---|---|---|---|
| Line 1 | | | | | 0,4 | | | | |
| Line 2 | | | | 0,3 | 1,4 | 0,5 | | | |
| Line 3 | | | 0,2 | 1,3 | 2,4 | 1,5 | 0,6 | | |
| Line 4 | | 0,1 | 1,2 | 2,3 | 3,4 | 2,5 | 1,6 | 0,7 | |
| Line 5 | 0,0 | 1,1 | 2,2 | 3,3 | 4,4 | 3,5 | 2,6 | 1,7 | 0,8 |
| Line 6 | 1,0 | 2,1 | 3,2 | 4,3 | 5,4 | 4,5 | 3,7 | 2,7 | 1,8 |

The other video data stored in memory as shown in Table I will be read-out in succeeding scanning lines by continuing with the pattern shown in Table II. It is seen that such a read-out algorithm does lose complete video data rendition in the corrected scanning lines. Since the read-out algorithm to compensate for vertical distortion at the bottom of the raster will be the same as that at the top except reversed upward in direction, such loss of data will occur on the corrected scanning lines at both the top and bottom of the raster. However, this effect is minor as compared with the advantage achieved by achieving correct convergence of the monochrome images produced by the CRTs in a projection television receiver.

Figure 4:
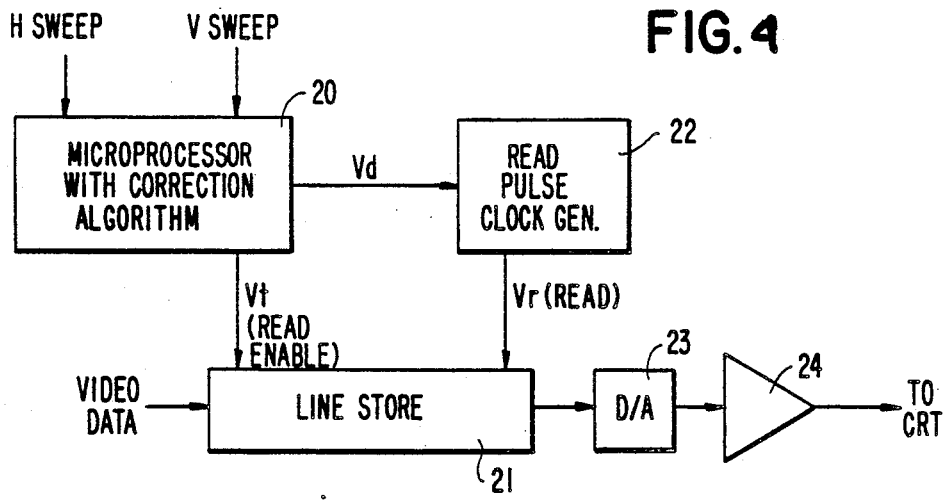
FIG. 4 is a block diagram of an image distortion correction circuit in accordance with the invention for correcting H distortion of a CRT raster.

FIG. 4 is a block diagram of a raster distortion correction circuit which operates in accordance with the principles described above with reference to FIG. 1b for correcting H distortion. It provides the requisite time delay $t_{d1}$ at the beginning and end of each H scanning line, and the corresponding data rate R at which video data should be supplied to the CRT during such H line. A microprocessor 20 is programmed with the correction algorithm for determining the values of $t_{d1}$ and the data rate R, and supplies a read enable signal $V_t$ to an H line store in which the video data for a given H line is stored prior to commencement of such line. Such read enable signal is delayed for the time interval $t_{d1}$ following initiation of the H sweep signal for the given H line, so that read-out is commenced after such a time delay. Microprocessor 20 also supplies a data rate control signal $V_d$ to clock pulse generator 22, which modulates the width of the clock pulses produced thereby so that a corresponding variation is produced in the rate at which video data in store 21 is read-out. The base frequency of pulse generator 22 is the bit rate to which the input video data is synchronized. The data thus read-out is converted by a D/A converter 23, the resulting analogue video signal being amplified by a video amplifier 24 and supplied in conventional manner to the CRT on which the image is to be displayed.

The correction algorithm for microprocessor 20 can be determined by supplying video data producing a test image on the CRT screen, adjusting the H sweep signal to overscan so that the central H scanning line just fills the image raster, and adjusting the time delay $t_{d1}$ and data rate R of each successive H line so that the left and right edges of the image on the CRT screen are vertical. The values of $t_{d1}$ and R for each H line are stored, and subsequently utilized upon initiation of each such line during reproduction of the image on the CRT display screen.

Figure 5:
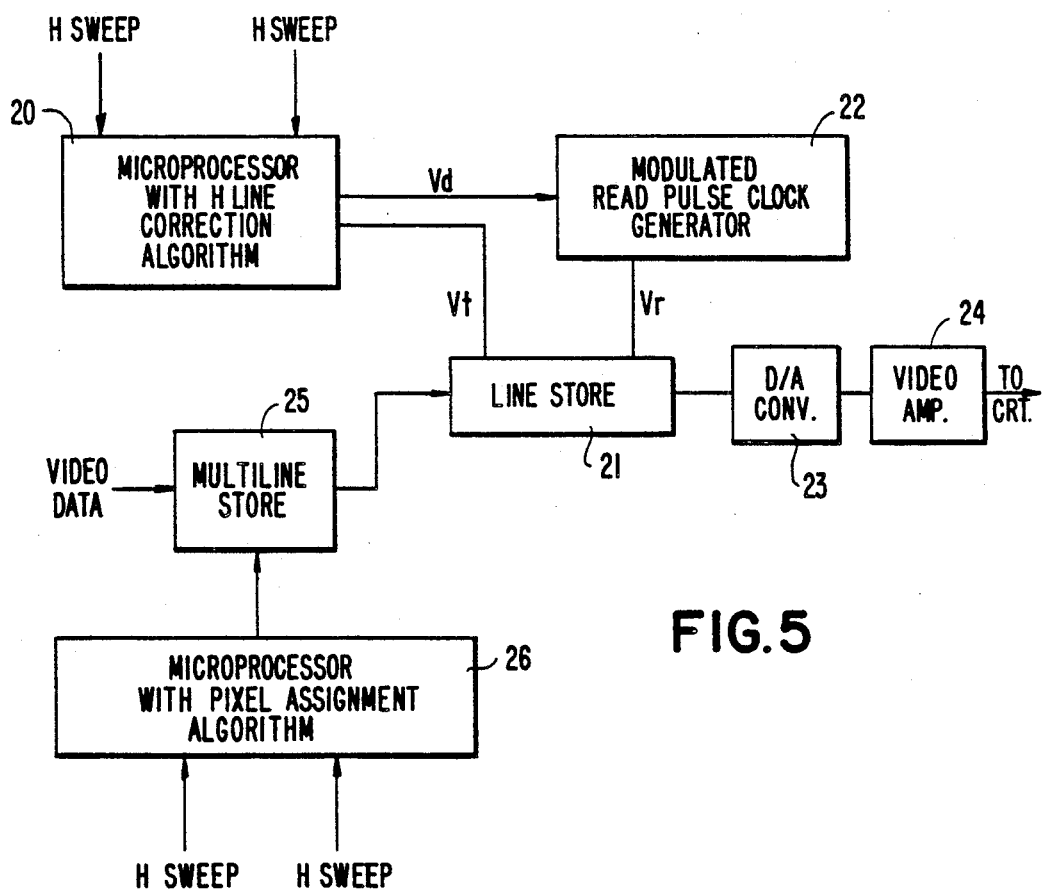
FIG. 5 is a block diagram of a modification of the circuit of FIG. 4 so as to additionally provide correction of V distortion of the CRT raster.

The circuit in FIG. 4 can readily be extended to also provide correction of vertical distortion, as described above with reference to FIG. 3. As shown in FIG. 5, a multiline store 25 is controlled by a microprocessor 26 programmed with an algorithm for re-assigning the video data for pixels on a number of H scanning lines in the vicinity of the top and bottom of the CRT raster as described above with reference to Tables I and II. Microprocessor 26 supplies address signals to store 25 which causes the video data therein for pixels on each of such scanning lines to be read-out for vertically corresponding pixels on others of such scanning lines so as to compensate for the distorted re-positioning of the original pixels. Consequently, for a given H line the video data transmitted to line store 21 will have been altered as required to provide the necessary compensation for vertical distortion. Microprocessor 26 can obviously be realized by additional programming of the same microprocessor which serves as microprocessor 20 for correcting horizontal distortion.

While the invention has been described with reference to certain preferred embodiments thereof, it will be apparent to those skilled in the art that various modifications and adaptations thereof may be made without departing from the teachings and scope of the invention as defined in the ensuing claims.

What is claimed is:

1. A circuit for correcting distortion of the scanning line raster on the display screen of a cathode ray display tube (CRT), which raster is produced by periodic horizontal (H) and vertical (V) sweep signals supplied to the CRT, such distortion causing increased lengthening of scanning lines increasingly further from the horizontal center of the raster, such circuit comprising:

a line store for receiving and storing, prior to initiation of any scanning line by the H sweep signal, digital video data for successive pixels on such scanning line;

clock pulse generating means for supplying read-out clock pulses to said line store to produce read-out of the video data stored therein at a rate determined by the clock pulse rate, such read-out commencing when said line store is enabled by a read-enable signal supplied thereto; and first microprocessor means for receiving said H and V sweep signals and which is programmed with a correction algorithm for determining, based on the relationship between the length of each successive scanning line and the period of said H sweep signal, a time delay value ($t_{d1}$) and a data rate value (R);

said time delay value ($t_{d1}$) for any given scanning line corresponding to the required time delay between initiation of such line by said H sweep signal and display of video data thereon in order to compensate for lengthening of such line due to distortion of said raster, said data rate value (R) being the rate at which video data is to be supplied for the pixels on such line in order to compensate for the reduced scanning time of such line due to said time delay;

said first microprocessor means being adapted to supply a read-enable signal to said line store prior to each scanning line which is delayed by a time delay $t_{d1}$ following initiation of the H sweep signal for such scanning line, and to further supply a pulse rate modulating signal to said pulse generating means for controlling the pulse rate thereof to correspond with said data rate (R) applicable to such scanning line.

2. A CRT raster distortion correction circuit as claimed in claim 1, wherein the raster distortion further causes non-linear vertical displacement of a number of scanning lines in the vicinity of at least one horizontal edge of said raster, and further comprising' a multiline store for receiving and storing, prior to said vertically displaced scanning lines, digital video data corresponding to the pixels on such lines; the video data for each pixel being stored at a respective memory location in said multiline store; and second microprocessor means for receiving said H and V sweep signals and programmed with a video data re-assignment algorithm for determining, based on the extent of vertical displacement of each of said vertically displaced scanning lines, a re-allocation of the video data applicable to the pixels thereon to vertically corresponding pixels on others of such lines so as to compensate for such displacement;

said second microprocessor means being responsive to the H sweep signal for any of said scanning lines to supply address signals to said multiline store to produce read-out therefrom of the video data re-assigned to the pixels on such scanning line;

said multiline store being connected to supply the video data read-out therefrom for any scanning line to said single line store upon initiation of such scanning line.

3. A CRT raster distortion correction circuit as claimed in claim 2, wherein said first and second microprocessor means are realized by programming of a single microprocessor.

* * * * *